United States Patent [19]
Bendler et al.

[11] 3,817,263
[45] June 18, 1974

[54] DEVICE FOR THE INFLATION OF SAFETY CUSHIONS IN VEHICLES

[75] Inventors: Hellmut Bendler, Erlangen-Spardorf; Heinz Gawlick, Furth; Günther Marondel, Erlangen, all of Germany

[73] Assignee: Dynamit Nobel AG, Troisdorf, Germany

[22] Filed: Apr. 2, 1973

[21] Appl. No.: 346,806

Related U.S. Application Data

[63] Continuation-in-part of Ser. No. 95,718, Dec. 7, 1970.

[30] Foreign Application Priority Data

Dec. 6, 1969 Germany.......................... 1961308

[52] U.S. Cl. ................. 137/68, 280/150 AB, 222/3
[51] Int. Cl. ............................................ F16k 13/04
[58] Field of Search ....... 102/39, 46; 149/22; 222/3, 222/5; 280/150 AB; 220/89 A, 47; 137/68

[56] References Cited
UNITED STATES PATENTS

| | | | |
|---|---|---|---|
| 2,878,965 | 3/1959 | Hirt et al. | 222/5 |
| 3,180,373 | 4/1965 | Hebenstreit | 222/5 |
| 3,340,809 | 9/1967 | Stadler et al. | 102/39 |
| 3,450,414 | 6/1969 | Kobori | 280/150 AB |
| 3,528,681 | 9/1970 | Ekstrom | 280/150 AB |

FOREIGN PATENTS OR APPLICATIONS

| | | | |
|---|---|---|---|
| 854,003 | 11/1960 | Great Britain | 222/5 |

*Primary Examiner*—Allen N. Knowles
*Attorney, Agent, or Firm*—Craig and Antonelli

[57] ABSTRACT

Device for inflating safety cushions in a vehicle having an electrically ignitable cartridge provided with a pyrotechnical mixture free of brisant or high explosive within a cartridge casing of low strength material. The cartridge casing material is of a low strength so as to prevent the cartridge casing acting as a tamp for accommodating inadvertent detonation of the cartridge by itself. The cartridge is arranged within a pressure tank equipped with a liquid gas in communication with the interior of a safety cushion by means of an extension having at least one gas passage aperture, which extension is sealed with respect to the liquid gas by a bursting or rupturing diaphragm. The pressure tank includes a cartridge housing for removably accommodating the cartridge. The walls of the cartridge housing are of a high strength material and are so dimensioned with respect to the cartridge casing that the cartridge housing serves as a tamp for facilitating optimum detonation of the high explosive free pyrotechnical mixture.

35 Claims, 3 Drawing Figures

PATENTED JUN 18 1974    3,817,263

DEVICE FOR THE INFLATION OF SAFETY CUSHIONS IN VEHICLES

BACKGROUND AND SUMMARY OF THE INVENTION

This application is a continuation-in-part of application of U.S. Pat. Ser. No. 95,718, filed Dec. 7, 1970.

The present invention relates to a device for the inflation of safety cushions in vehicles.

In order to increase the safety of vehicle passengers especially passengers of automotive vehicles, safety cushions are known which are preferably arranged at the dashboard in automotive vehicles and are automatically inflated when the vehicle hits an obstacle, or also are already inflated when a predetermined deceleration value is exceeded. These known safety cushions are disposed protectively in front of the passenger or passengers during this procedure.

In the case of automotive vehicles, the arrangement is generally effected as illustrated in FIG. 1. An inflatable container 4, i.e. the casing of a safety cushion, arranged between the passenger or passengers and the dashboard and/or the sidewalls of the vehicle in the folded condition, is in effective communication with a tank 3, which is filled with a propellant such as, in most cases, black powder or gunpowder as well as with a liquid gas such as, for example, Freon 12. The tank 3, in turn, is connected to the current source 2, which is independent of the other current sources of the vehicle, or with the vehicle battery, as well as with the inertial switch 1 actuated upon impact of the vehicle or upon exceeding a predetermined delay or deceleration value, which switch than closes the circuit and thus triggers the ignition or detonation. In an emergency, the switch 1 closes the circuit and triggers the electric ignition or detonation which, in turn, allows the propellant to liberate the liquid gas which then flows into the cushion 4 and inflates the same within a relatively short period of time.

The use of a propellant powder of the high or brisant explosive type, i.e. black powder, has several serious disadvantages such as, for example, an insufficient shelf life. A further very important disadvantage of the high explosive propellant relates to the ease of detonation of same such that the propellant creates considerable danger when removed, either intentionally for replacement or for unauthorized purposes, from the installed position in the liquid gas tank.

It is an object of the present invention to avoid the above-mentioned disadvantages and dangers connected with the use of high explosives such as black powder and, moreover, to provide, quite generally, a device which, though fully effective in the function assigned thereto, is not dangerous when individual parts thereof, especially the cartridge, are used for unintended purposes, and which can also be handled by persons who have had no experience with the manipulation of propellant powders and explosives with a minimum of danger.

In accordance with the present invention, the foregoing problems have been solved by arranging, in a pressure tank or pressurized container provided with a liquid gas and being in communication with the interior of the safety cushion by means of an extension sealed with respect to the liquid gas by a rupturing or bursting diaphragm and having at least one, and preferably several, gas passage apertures, an electrically ignitable cartridge provided with a high explosive-free or low explosive pyrotechnical mixture bounded by a low strength cartridge casing so as to prevent the cartridge casing acting as a tamp for accommodating inadvertent detonation of the cartridge when the cartridge is removed from the pressure tank. The pressure tank includes a cartridge housing for removably accommodating the cartridge. The walls of the cartridge housing are of a high strength material and are so dimensioned with respect to the cartridge casing that the cartridge housing serves as a tamp for facilitating optimum detonation of the high-explosive-free pyrotechnical mixture.

In an advantageous embodiment of the present invention, the provision is made to form the cartridge housing with a smaller wall thickness on its periphery in the longitudinal direction at several points. In this connection, the cartridge housing is preferably centrally arranged within the pressure tank, so that, during the rupturing of the cartridge housing, liquid gas is constantly vaporized by the thus-liberated calories during rupturing of the cartridge housing. Instead of the provision of predetermined rupturing points, the cartridge housing can suitably also be provided with perforations having a cross section adapted to the respective requirements. In this case, it is necessary to cover the perforations with a metallic foil such as, for example, a thin aluminum foil, with respect to the liquid gas, so that the latter cannot diffuse through the propellant cartridge inserted in the cartridge housing.

According to a further feature of the present invention, the cartridge is designed so that a cartridge casing is tamped only at both ends and filled with the low explosive or high explosive-free protechnical composition. In this connection, the cartridge casing is preferably made of a thermoplastic synthetic resin such as, for example, polyethylene or polystyrene. The pyrotechnical composition is ignited electrically. A mixture of an oxygen carrier, a gas generator and a metallic powder is especially suitable for the primer composition or the high-explosive-free pyrotechnical mixture. In this connection, barium nitrate, $Ba(NO_3)_2$, is especially advantageous as the oxygen carrier. A preferred gas generator is aminoguanidine axotetrazole, and a preferred gas generator is aminoguanidine azotetrazole, and a preferred metal is zirconium, aluminum, magnesium, boron, or the like. The mixture can have the following composition, for example:

55 – 70% barium nitrate

5 – 10% boron, and

20 – 40% aminoguanidine azotetrazole, or

40 – 57% barium nitrate

3 – 7% vanadium pentoxide, and

40 – 57% aminoguanidine azotetrazole, or

40 – 57% barium nitrate

2 – 20% aluminum titanium

1 – 6% boron, and

40 – 57% aminoguanidine azotetrazole.

(The above are percentages by weight)

For obtaining a uniform and as simultaneous as possible an ignition of the igniting composition, the provision is made to arrange the same around a readily destructible and/or combustible tube preferably produced from thin-walled cardboard and disposed centrally within the cartridge.

A simpler design of the igniting device can be obtained by constructing the same as a bridge primer with a booster charge. The device can be so constructed, for example, that approximately 1.5 volts and 0.8 ampere are required for ignition at an internal resistance of the primer device of about 1–2 ohms. Of course, the electrical conditions can and will, however, be adapted to the respective requirements which are very different in certain cases, especially to the selection of the current source which can be the dashboard circuit or can consist of an additional battery. The present invention can be utilized in land vehicles as well as in air and water craft.

BRIEF DESCRIPTION OF THE DRAWINGS

These and further objects, features and advantages of the present invention will become more apparent from the following description when taken in conjunction with the accompanying drawing which shows, for purposes of illustration only, an embodiment in accordance with the present invention and wherein.

DETAILED DESCRIPTION OF THE DRAWINGS

Figure 2:
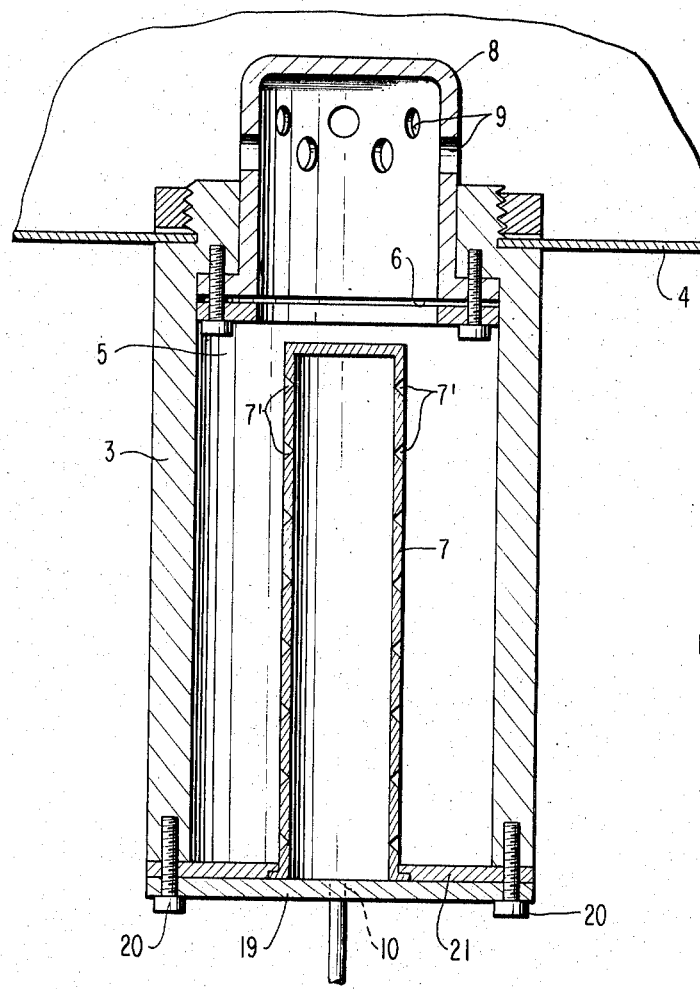
FIG. 2 is a sectional view of one possible arrangement of the liquid tank and propellant cartridge housing with respect to the safety cushion, according to the present invention.
Figure 3:
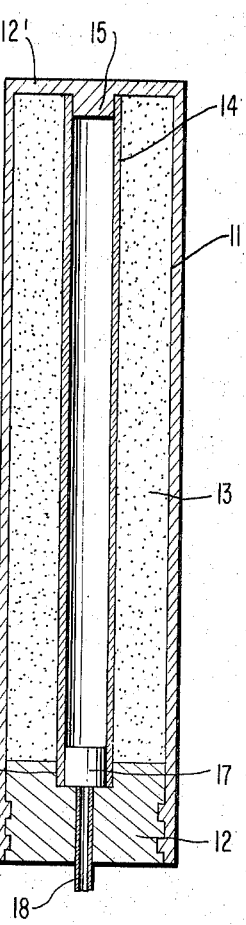
FIG. 3 is a cross-sectional elevation view of an embodiment of a ignitable cartridge in accordance with the present invention.

Referring now to the drawing and, in particular, to FIG. 2, the pressure tank 3 containing the liquid gas (not shown) is in communication with the safety cushion 4. The tank 3 extends into the cushion with an exterior part 8 provided with the gas passage apertures 9. The chamber 5 containing the liquid gas is sealed with respect to the interior of the cushion 4 by means of the diaphragm 6. The cartridge housing 7, which is made of a high-strength material such as, for example, steel and intended for receiving the cartridge shown in FIG. 3 is centrally arranged within the tank 3. Predetermined rupturing points formed as sealed perforations 7' are schematically shown along the length of casing 7. The sealing lid 19 is provided with the perforations 10 for passing the electrical leads to the cartridge therethrough.

The cartridge to be inserted in the cartridge housing 7 is provided, as shown in FIG. 3, with the casing walls 11 made of a relatively weak shatter-resistant material, such as a thermoplastic synthetic resin, like polyethylene or polystyrene. An end tamp 12 is arranged on one front end of the cartridge casing. The cartridge casing is sealed at the other end 12'. The tamp end 12 is provided with a depression 16 and the other end 12' is provided with a plug 15, preferably formed integrally with end 12'. The depression 16 and plug 15 serve for the reception and guidance of a hollow, thin walled cardboard tube 14. The explosive-free pyrotechnical composition 13 is accommodated between casing walls 11 and tube 14. At the inlet or tamp end 12 of the cartridge, a bridge primer 17 is disposed in the cardboard tube 14 which is connected with the leads 18. When the cartridge is assembled in cartridge housing 7, these leads extend through openings 10.

Figure 1:
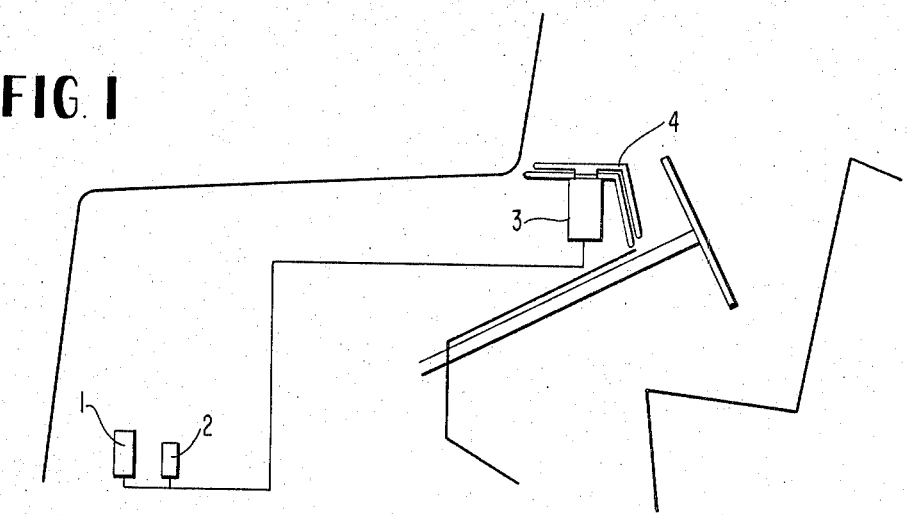
FIG. 1 is a schematic view of an arrangement of a conventional safety cushion as discussed above.

In operation, the electrical leads 18 passing through perforations or openings 10 are connected with a current source, such as represented schematically by reference numeral 2 in FIG. 1, by way of an inertial switch 1, also shown schematically in FIG. 1. Upon impact of the vehicle or upon exceeding a predetermined delay or acceleration of the vehicle, switch 1 closes the circuit and triggers the ignition of the cartridge assembly. Ignition of the cartridge assembly, in turn, allows the propellant to liberate the liquid gas which then flows into the cushion 4 and inflates the same within a relatively short period of time.

The cartridge shown in FIG. 3 has the advantage that it will become fully effective only when installed with an effective tamp because of the low explosive or high-explosive-free nature of the composition 13. Also, the plastic casing walls 11 prevents the formation of splinters when the cartridge is ignited outside of the housing cartridge 7 which renders the ignition relatively harmless. Further, in the case of an unauthorized removal of the pyrotechnical composition 13 from both the housing 7 and casing 11, the composition is relatively harmless since it can be ignited only with difficulty and then burns up without any danger due to its low explosive nature.

The inside dimensions of housing 7 correspond closely to the outside dimensions of the cartridge of FIG. 3 such that the relatively strong housing 7 serves as a very effective tamp for optimizing the detonation of the composition 13 when the cartridge is installed in housing 7. The housing 7 is constructed of sufficient strength so as not to burst at least until sufficient reaction pressures for accommodating a rapid rupture of diaphragm 6 and consequent gas passage to the cushion have been built up after initial ignition of the composition 13. Since the composition 13 is high-explosive-free, this tamping function of housing 7 is very important in assuring adequate detonation pressure forces.

Sealing lid 19 is preferably attached to the walls of the pressure container 3 by screws 20 extending through clamping plate 21. The clamping plate 21 serves to securely clamp the housing 7 to the lid 19 by way of interengaging annular lip and collar means on the plate 21 and housing 7. This particular arrangement exhibits further safety advantages in that loosening of screws 20 simultaneously loosens the clamping engagement of housing 7 and lid 19 to reduce the effective tamping forces on a cartridge within housing 7. That is, after the screws 20 have been loosened or released and the housing 7 is perhaps removed from the pressure container 3, the lid 19 is no longer firmly joined to the housing 7, so that the high-explosive-free pyrotechnical mixture present within a cartridge is reacted without danger even if the cartridge has been removed together with the case 7 from the pressure container or tank, but is still within the housing 7 during improper ignition.

While we have shown and described an embodiment in accordance with the present invention, it is to be clearly understood that the same is susceptible of numerous changes and modifications as are encompassed by the scope of the present invention. For example, the safety cushion means could be positioned either within the vehicle to cushion passengers or on the outside of the vehicle to cushion collisions of the vehicle with other vehicles or objects. We, therefore, do not wish to

We claim:

1. An arrangement for inflating inflatable safety cushion means of the type used to cushion passengers and the like in vehicles, said arrangement comprising:

pressure tank means for accommodating a highly pressurized inflating medium, inflating medium aperture means opening into said safety cushion means, rupturable diaphragm means for sealing said aperture means from the inflating medium, ignitible cartridge means including a high-explosive-free pyrotechnical mixture surrounded by cartridge casing means, cartridge housing means extending into said pressure tank means for housing said cartridge means such that ignition of said pyrotechnical mixture with said cartridge means in said housing means effects an increase in the pressure of said inflating medium and consequent rupture of said diaphragm means such that said cushion means is inflated by said inflating medium passing from said pressure tank means through said aperture means into said cushion means, and igniting means for igniting said pyrotechnical mixture, wherein said cartridge casing means is constructed relatively weak as compared to said housing means such that said casing means provides insufficient tamping forces on said pyrotechnical mixture to accommodate detonation of said cartridge means outside of said housing means and such that said housing means provides sufficient tamping forces on said pyrotechnical mixture by way of said casing means to accommodate relatively optimum detonation of said cartridge means when said cartridge means is in said housing means.

2. An arrangement according to claim 1, wherein said ignition means includes electrical means.

3. An arrangement according to claim 1, wherein the inside dimensions of said housing means correspond closely to the outside dimensions of said casing means such that the walls of said housing means provide immediately adjacent backing and tamping support to the walls of said casing means.

4. An arrangement according to claim 3, wherein said housing means closely surrounds said casing means over substantially the entire outer surface of said casing means.

5. An arrangement according to claim 4, wherein said housing means includes an opening adjacent one end thereof for accommodating electrical wires leading to said igniting means.

6. An arrangement according to claim 1, wherein said aperture means are provided in extension means of said pressure tank means.

7. An arrangement according to claim 6, wherein said extension means is a cylindrical member closed at one end by a fixed wall and closed at the other end by said diaphragm means, said aperture means including a plurality of radially extending openings in the side walls of said cylindrical member adjacent said fixed wall.

8. An arrangement according to claim 7, wherein said pressure tank means is cylindrically shaped and has a longitudinal centerline coinciding with the longitudinal centerline of said extension means.

9. An arrangement according to claim 8, wherein said housing means and said cartridge means are cylindrically shaped with respective longitudinal centerlines coinciding with said centerlines of said extension and said pressure tank means when said cartridge means is in said housing means.

10. An arrangement according to claim 1, wherein the housing means is made of steel.

11. An arrangement according to claim 1, wherein the housing means is provided, at least over a portion of its length, with predetermined rupturing points.

12. An arrangement according to claim 11, wherein the rupturing points are provided over the entire length of the housing means.

13. An arrangement according to claim 1, wherein the housing means is provided, at least over a portion of its length, with perforations.

14. An arrangement according to claim 13, wherein the perforations are provided over the entire length of the housing means.

15. An arrangement according to claim 1, wherein the side walls of said casing means are made of a thermoplastic synthetic resin.

16. An arrangement according to claim 15, wherein the thermoplastic synthetic resin is from the group consisting of polyethylene and polystyrene.

17. An arrangement according to claim 1, wherein the pyrotechnical mixture includes an oxygen carrier, a gas generator and a metallic powder.

18. An arrangement according to claim 17, wherein the oxygen carrier is barium nitrate, $Ba(NO_3)_2$, the gas generator is aminoguanidine azotetrazole, and the metallic powder is from the group consisting of zirconium, aluminum, magnesium or boron.

19. An arrangement according to claim 1, wherein a readily destructible and/or combustible central hollow tube is located within the casing means, said pyrotechnical mixture being arranged around said central hollow tube.

20. An arrangement according to claim 19, wherein the central hollow tube is made of thin-walled cardboard.

21. An arrangement according to claim 1, wherein the igniting means includes a bridge primer and a booster charge in the cartridge means and electrical wires leading from said bridge primer.

22. An arrangement according to claim 1, wherein said pressure tank means includes a detachable lid means, and wherein said lid means is firmly attached to said housing means in the assembled condition so as to assist in providing said sufficient tamping forces on said pyrotechnical mixture.

23. An arrangement according to claim 22, wherein said lid means is connected to said pressure tank means by detachable connecting means extending through a clamping plate means interposed between said lid means and said pressure tank means, and wherein said clamping plate means clampingly forces said housing means against said lid means when said detachable connecting means are tightly secured.

24. An arrangement according to claim 23, wherein said detachable connecting means are screw means, wherein said clamping plate means is an annular plate which has a lip portion which clampingly engages over a corresponding collar portion at one end of said housing means, and wherein said lid means forms an end wall of said housing means in the assembled condition.

25. An arrangement according to claim 23, wherein said clamping plate means and detachable connecting means are so configured that loosening of said detachable connecting means from said pressure tank means simultaneously loosens said lid means from said housing means so as to reduce the effective tamping forces on a cartridge means inserted in said housing means.

26. An arrangement for inflating inflatable safety cushion means of the type used to cushion passengers and the like in vehicles, said arrangement comprising:

pressure tank means for accommodating a highly pressurized inflating medium,
inflating medium aperture means opening into said safety cushion means,
rupturable diaphragm means for sealing said aperture means from the inflating medium,
ignitable cartridge means including a pyrotechnical mixture surrounded by cartridge casing means,
cartridge housing means extending into said pressure tank means for housing said cartridge means such that ignition of said pyrotechnical mixture with said cartridge means in said housing means effects an increase in the pressure of said inflating medium and consequent rupture of said diaphragm means such that said cushion means is inflated by said inflating medium passing from said pressure tank means through said aperture means into said cushion means,
and igniting means for igniting said pyrotechnical mixture,
wherein said cartridge casing means is constructed relatively weak as compared to said housing means such that said casing means provides insufficient tamping forces on said pyrotechnical mixture to accommodate detonation of said cartridge means outside of said housing means and such that said housing means provides sufficient tamping forces on said pyrotechnical mixture by way of said casing means to acommodate relatively optimum detonation of said cartridge means when said cartridge means is in said housing means.

27. An arrangement according to claim 26, wherein the pyrotechnical mixture includes an oxygen carrier, a gas generator and a metallic powder.

28. An arrangement according to claim 27, wherein the oxygen carrier is barium nitrate, Ba (NO$_3$)$_2$, the gas generator is aminoguanidine azotetrazole, and the metallic powder is from the group consisting of zirconium, aluminum, magnesium or boron.

29. An arrangement according to claim 26, wherein the inside dimensions of said housing means correspond closely to the outside dimensions of said casing means such that the walls of said housing means provide immediately adjacent backing and tamping support to the walls of said casing means.

30. An arrangement according to claim 29, wherein said housing means closely surrounds said casing means over substantially the entire outer surface of said casing means.

31. An arrangement according to claim 30, wherein said pressure tank means includes an opening for accommodating insertion and removal of said cartridge means and a detachable lid means covering said opening, and wherein said lid means is firmly attached to said housing means in the assembled condition so as to assist in providing said sufficient tamping forces on said pyrotechnical mixture.

32. An arrangement according to claim 31, wherein said lid means is connected to said pressure tank means by detachable connecting means extending through a clamping plate means interposed between said lid means and said pressure tank means, and wherein said clamping plate means clampingly forces said housing means against said lid means when said detachable connecting means are tightly secured.

33. An arrangement according to claim 32, wherein said detachable connecting means are screw means, wherein said clamping plate means is an annular plate which has a lip portion which clampingly engages over a corresponding collar portion at one end of said housing means, and wherein said lid means forms an end wall of said housing means in the assembled condition.

34. An arrangement according to claim 32, wherein said clamping plate means and detachable connecting means are so configured that loosening of said detachable connecting means from said pressure tank means simultaneously loosens said lid means from said housing means so as to reduce the effective tamping forces on a cartridge means inserted in said housing means.

35. An arrangement according to claim 26, wherein said pressure tank means includes an opening for accommodating insertion and removal of said cartridge means and a detachable lid means covering said opening, and wherein said lid means is firmly attached to said housing means in the assembled condition so as to assist in providing said sufficient tamping forces on said pyrotechnical mixture.

* * * * *